United States Patent
Kanaya (10) Patent No.: US 6,882,438 B1
(45) Date of Patent: Apr. 19, 2005

(54) METHOD AND APPARATUS CAPABLE OF PERFORMING INFORMATION TRANSFER OPERATION WITH PERFORMANCE SECURITY MEASURES

(75) Inventor: Atsushi Kanaya, Kanagawa-ken (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 09/568,479

(22) Filed: May 10, 2000

(30) Foreign Application Priority Data

May 21, 1999 (JP) .......................................... P11-141415

(51) Int. Cl.[7] .............................. G06F 15/00; H04N 1/00
(52) U.S. Cl. ...................... 358/1.15; 358/407; 358/442; 379/100.09
(58) Field of Search ............................... 358/400, 1.15, 358/402, 403, 442, 407, 439; 709/206; 379/100.09

(56) References Cited

U.S. PATENT DOCUMENTS

| | | | | |
|---|---|---|---|---|
| 5,517,324 A | * | 5/1996 | Fite et al. | 358/434 |
| 5,935,250 A | * | 8/1999 | Shimizu | 713/201 |
| 6,005,677 A | * | 12/1999 | Suzuki | 358/442 |
| 6,020,981 A | * | 2/2000 | Ogiyama | 358/434 |
| 6,434,601 B1 | * | 8/2002 | Rollins | 709/206 |
| 6,690,480 B1 | * | 2/2004 | Maeda | 358/1.15 |
| 6,693,729 B1 | * | 2/2004 | Bloomfield | 358/402 |

* cited by examiner

Primary Examiner—Edward Coles
Assistant Examiner—Chan S. Park
(74) Attorney, Agent, or Firm—Cooper & Dunham LLP (57) ABSTRACT

A data terminal coupled to a local area network and a public switched telephone network includes first and second communications devices and a controller. The first and second communications devices transmit and receive communications data through the local area network and communications information through the public switched telephone network, respectively. The controller instructs the first communications device to perform a first data transfer operation for transferring communications data to a destination data terminal connected to the local area network when the second communications device receives destination identification information identifying the destination data terminal during a time when the second communications device performs a receiving operation for receiving the communications information from a communications machine connected to the public switched telephone network. The controller determines whether conditions of the first data transfer operation performed by the first communications device are proper and instructs the second communications device to terminate the receiving operation when the controller determines that the conditions of the first data transfer operation are improper.

18 Claims, 8 Drawing Sheets

ADDRESS CONVERSION TABLE (4d)

| SUB-ADDRESS | E-MAIL ADDRESS |
|---|---|
| 0001 | ws1@abc.co.jp |
| 0002 | ws2@abc.co.jp |
| 0003 | ws3@abc.co.jp |
| ... | ... |

COMMUNICATION FAILURE REPORT

A REQUEST OF FACSIMILE TRANSFER HAS BEEN REJECTED AND A FACSIMILE MESSAGE HAS NOT BEEN RECEIVED DUE TO FUALTY LAN ENVIRONMETAL CONDITIONS.
PLEASE INFORM THE BELOW LISTED CALLING TERMINAL OF THIS COMMUNICATION FAILURE.

CALLING TERMINAL                0462-11-1111

ADDRESS INFORMATION             0031

Fig. 8

METHOD AND APPARATUS CAPABLE OF PERFORMING INFORMATION TRANSFER OPERATION WITH PERFORMANCE SECURITY MEASURES

CROSS-REFERENCE TO RELATED APPLICATIONS

This application claims priority under 35 U.S.C. §119 to Japanese patent application No. JPAP11-141415 filed on May 21, 1999, the entire contents of which are hereby incorporated by reference.

BACKGROUND

1. Field

The disclosed method and system relates to a network facsimile apparatus, and more particularly to a network facsimile apparatus which is capable of performing an information transfer operation with measures for securing performance.

2. Description of the Related Arts

There has been developed a so-called network facsimile machine that is capable of handling E-mail (electronic mail) as well as facsimile image information. In handling E-mail, the network facsimile machine communicates with other data terminals via a local area network (LAN) and the Internet, and in handling facsimile image information the network facsimile machine communicates with other facsimile machines via a public switched telephone network (PSTN).

Such a network facsimile machine is capable of receiving facsimile image information from a calling facsimile machine and transferring the received facsimile image information to destination data terminals such as PCs (personal computers) on the local area network. In this case, the network facsimile machine performs a Group 3 facsimile procedure, for example, and receives the facsimile image information and destination identification information from the calling facsimile machine. The destination identification information is a sub-address contained in a sub-address signal SUB defined by the recommendations T.30 of ITU-T (international telecommunication union-telecommunication). To determine the destination data terminal, the network facsimile machine converts the received sub-address into an E-mail address using an address conversion table.

In this case, the network facsimile machine temporarily stores the received facsimile image information but does not record it on a recording sheet. Upon completing the receiving operation, the network facsimile machine converts the stored facsimile image information into E-mail and sends it to the destination data terminal via the local area network. Therefore, the calling facsimile machine may determine that the transmission of the facsimile image information has been successfully transferred to the destination data terminal upon completing the transmission to the network facsimile machine without recognizing a failure which may occur during the transmission of the E-mail to the destination data terminal.

SUMMARY

The present application provides a novel data terminal that can be coupled to a local area network and a public switched telephone network. In one embodiment, a novel data terminal includes a first communications device, a second communications device, and a controller. The first communications device transmits and receives communications data through the above-mentioned local area network. The second communications device transmits and receives communications information through the above-mentioned public switched telephone network. The controller instructs the first communications device to perform a first data transfer operation for transferring communications data to a destination data terminal connected to the local area network when the second communications device receives destination identification information identifying the destination data terminal during a time when the second communications device performs a receiving operation for receiving the communications information from a communications machine connected to the public switched telephone network. In this novel data terminal, the above-mentioned controller determines whether conditions of the first data transfer operation performed by the first communications device are proper and instructs the second communications device to terminate the receiving operation when the controller determines that the conditions of the first data transfer operation are improper.

The controller may generate a communications failure report upon conducting a termination of the receiving operation performed by the second communications device.

The controller may generate a test message and instruct the first communications device to periodically perform a second data transfer operation for transmitting the test message to an own address of the data terminal such that the first communications device receives the test message returning via the local area network. Further, the controller may detect an event in which the first communications device improperly receives the test message and determine that the conditions of communications operations are improper when the event is detected.

In the above-mentioned data terminal, the communications data may be E-mail, the communications information be facsimile image information, and the destination identification information be an sub-address.

Further, the present invention provides a novel method of communications for a data terminal which is coupled to a local area network and a public switched telephone network. In one embodiment, the novel method includes the steps of performing, receiving, executing, determining, and terminating. The performing step performs a receiving operation for receiving communications information from a communications machine connected to the public switched telephone network. The receiving step receives destination identification information identifying a destination data terminal during the step for performing the receiving operation. The executing step executes a first data transfer operation for transferring communications data to a destination data terminal connected to the local area network. The determining step determines whether conditions of the first data transfer operation are proper. The terminating step terminates the receiving operation when the determining step determines that the conditions of the first data transfer operation are improper.

BRIEF DESCRIPTION OF THE DRAWINGS

A more complete appreciation of the present application and many of the attendant advantages thereof will be readily obtained as the same becomes better understood by reference to the following detailed description when considered in connection with the accompanying drawings, wherein.

DETAILED DESCRIPTION

In describing preferred embodiments illustrated in the drawings, specific terminology is employed for the sake of clarity. However, the invention is not intended to be limited to the specific terminology so selected and it is to be understood that each specific element includes all technical equivalents which operate in a similar manner.

Figure 1:
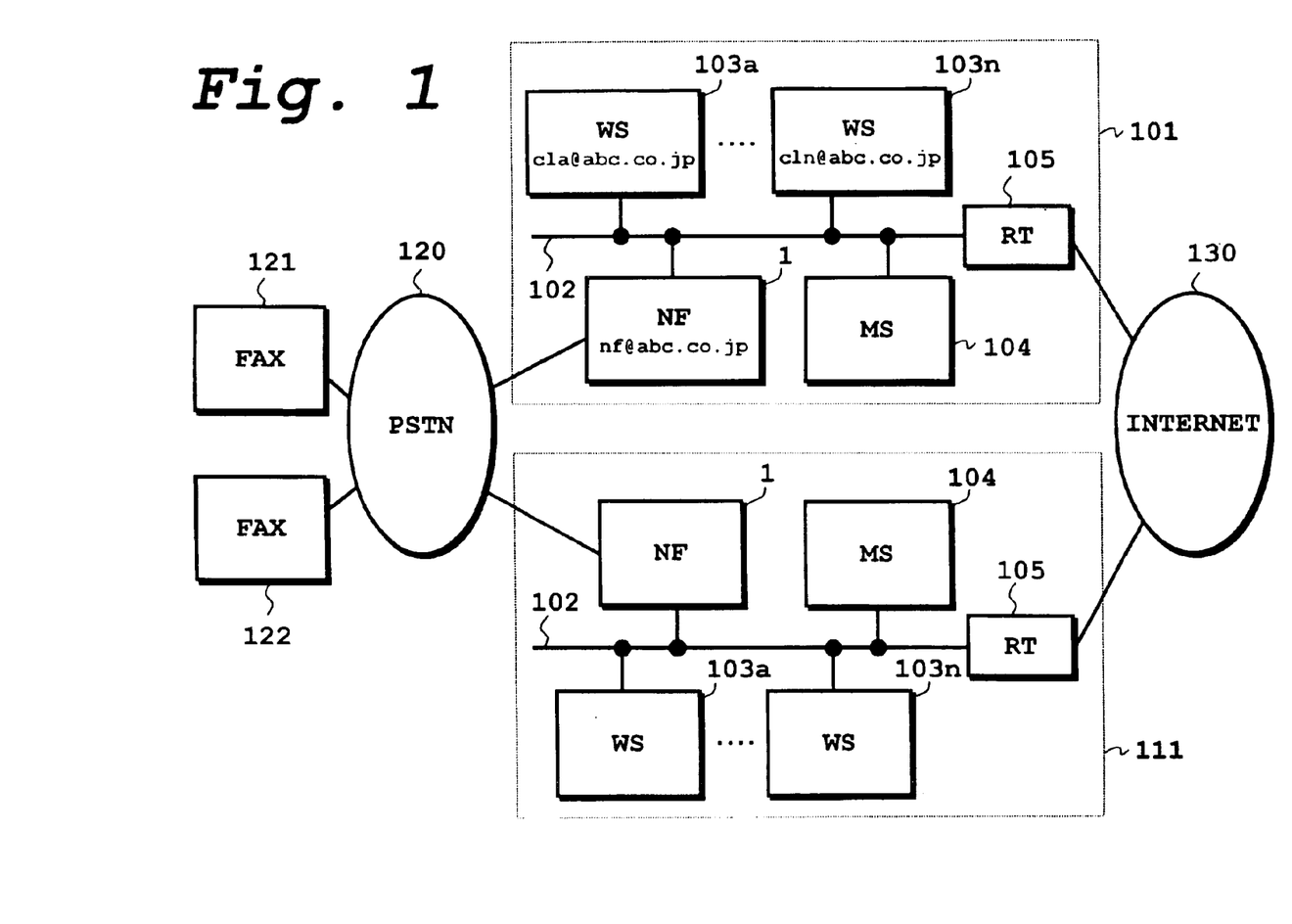
FIG. 1 is a block diagram of an electronic communications system including a network facsimile apparatus according to an embodiment of the present application.

Referring now to the drawings, wherein like reference numerals designate identical or corresponding parts throughout the several views, FIG. 1 illustrates an exemplary electronic communications system including a network facsimile apparatus (NF) 1. The electronic communications system of FIG. 1 includes various types of electronic communications networks such as a domain (DM) 101, a domain (DM) 111, a public switched telephone network (PSTN) 120, the Internet 130, and possibly other networks which are not specifically illustrated. The PSTN 120 may be substituted by an ISDN (integrated services digital network) or the like.

The DM 101 includes a local area network (LAN) 102 that connects various devices, including the above-mentioned network facsimile apparatus 1, a plurality of workstations (WSs) 103a–103n, a mail server (MS) 104, and a router (RT) 105 and that allows communications between the various devices. The DM 111 has a similar configuration to that of the DM 101 for the sake of simplicity. The PSTN 120 connects a plurality of communications terminals including Group 3 facsimile machines (FAX) 121 and 122 to allow communications between these terminals. The Internet 130 connects a plurality of domains (DMs), including the DMs 101 and 111, and allows communications between the domains.

In each of the DMs 101 and 111, the network facsimile apparatus 1 is connected to the LAN 102 and the PSTN 120 to function as a gateway to both networks. The RT 105 is connected to the LAN 102 and the Internet 130 to function as another gateway to these networks. Through these connections, each of the LANs 102 has a connection to the plurality of communications terminals including the FAXs 121 and 122 through the PSTN 120 and to the plurality of domains through the Internet 130.

Preferably, each of the FAXs 121 and 122 transmits and receives image information through a Group 3 facsimile communications procedure.

Each of the DMs 101 and 111 has an individual domain identification. Each of the DMs 101 and 111, the network facsimile apparatus 1, each of the WSs 103a-103n, and the MS 104 is given an individual network address, usually based on its individual address information coupled with the corresponding domain identification. A user who uses a workstation in the DM 101 is provided with an individual user address which is usually based on the user's individual name coupled with the above-mentioned individual network address of the workstation. Such an individual user address that is generally made of alphanumeric symbols including alphabetical characters is referred to as an electronic mail (E-mail) address. In FIG. 1, exemplary E-mail addresses given to the apparatuses connected to the LAN 102 of the domain 101 are shown. For example, the network facsimile apparatus 1 is labeled with an E-mail address of nf@abc.co.jp, the WS 103a is given cla@abc.co.jp, the WS 103n is given cln@abc.co.jp, and so on.

Using the above-described E-mail addresses and network addresses, communications are carried out between terminals including the WSs 103a-103n and the network facsimile apparatus 1 within a domain and between domains through the Internet 130.

The network facsimile apparatus 1 has functions for sending and receiving electronic mail (E-mail) to and from other terminal machines through the LAN 102. Also, the network facsimile apparatus 1 has general facsimile functions including a Group 3 facsimile communications capability for transmitting and receiving facsimile image information to and from destination facsimile machines through the PSTN 120. Using these functions, the network facsimile apparatus 1 operates as an information server between the facsimile machines of the PSTN and the workstations of the LAN 102. Also, it is also possible that the network facsimile apparatuses 1 located in the same domain or in different domains can communicate with each other using these functions.

Generally, a so-called protocol suite is applied for communications between machines connected to local area networks and via the Internet. In an operation of the protocol suite, a communication protocol, such as TCP/IP (transmission control protocol/Internet protocol) and another communication protocol are used in combination for up to a transport layer of an OSI (open systems interconnection), and for the layers higher than the transport layer, respectively. For example, an SMTP (simple mail transfer protocol) is used as a higher layer protocol for communications such as E-mail.

In each of the DMs 101 and 111, the LAN 102 employs a general mail server system in which an incoming E-mail is first stored in the MS 104 and then sent to a destination workstation. More specifically, when E-mail information reaches a domain, for example DM 101, the file server 104 checks a destination mail address attached to the E-mail and if the destination mail address is for a workstation of that domain the mail server system of the domain stores the E-mail into the MS 104. When the E-mail has a destination mail address other than one controlled by the domain, the mail server system of the domain transmits the E-mail to the Internet 130 via the RT 105, and the E-mail is sent to another domain, e.g. the DM 111, to seek the destination terminal machine, or to a host machine that has an address corresponding to the destination mail address attached to the E-mail, through a data transmission function of the Internet 130.

In the above-described server system, at a certain interval the network facsimile apparatus 1 and the WSs 103a–103n in each domain, e.g., DMs 101 and 111, request the MS 104 to check if an incoming E-mail addressed for a user of the requesting machine is stored therein. If an E-mail addressed to the user of the requesting machine is stored in the MS 104, the mail-server system transmits the E-mail to the requesting machine. Upon receiving the E-mail, the requesting machine indicates to the user that there is an incoming E-mail. In the example being described, the network facsimile apparatus 1 has an E-mail address to exchange E-mails as described above. The protocol is a POP (post office protocol), for example, to be applied for the communications from the WSs 103a-103n and the network facsimile apparatus 1 to the MS 104 to request the incoming check as described above.

Each of the WSs 103a-103n is provided with various application software programs including programs that are usually used by one or more users on an exclusive basis. These programs are provided for exchanging various kinds of data with other terminals through the LAN 102 and for executing various kinds of facsimile related operations. For example, a program generates facsimile image information and displays it on a screen.

Another program stored in each of the WSs 103a-103n converts binary data (e.g., facsimile information) into man-readable information (e.g., 7-bit data), using a predefined method (e.g., a Base 64 encoding method). This program is needed when the workstation sends E-mail with facsimile information since E-mail is not allowed to contain facsimile information as binary data. The format of the E-mail contents including the thus-converted facsimile information is referred to as a MIME format (multi-purpose Internet mail extensions).

The above-mentioned communication protocols, such as the TCP/IP, SMTP, and POP, as well as the data format and structure of the E-mail, including the MIME, are defined in an RFC (request for comments) published by an IETF (Internet engineering task force). For example, the TCP and IP are defined in an RFC793, the SMTP in an RFC821, and the data format and structure of the E-mail in an RFC822, RFC1521, RFC1522, and RFC1468.

Figure 2:
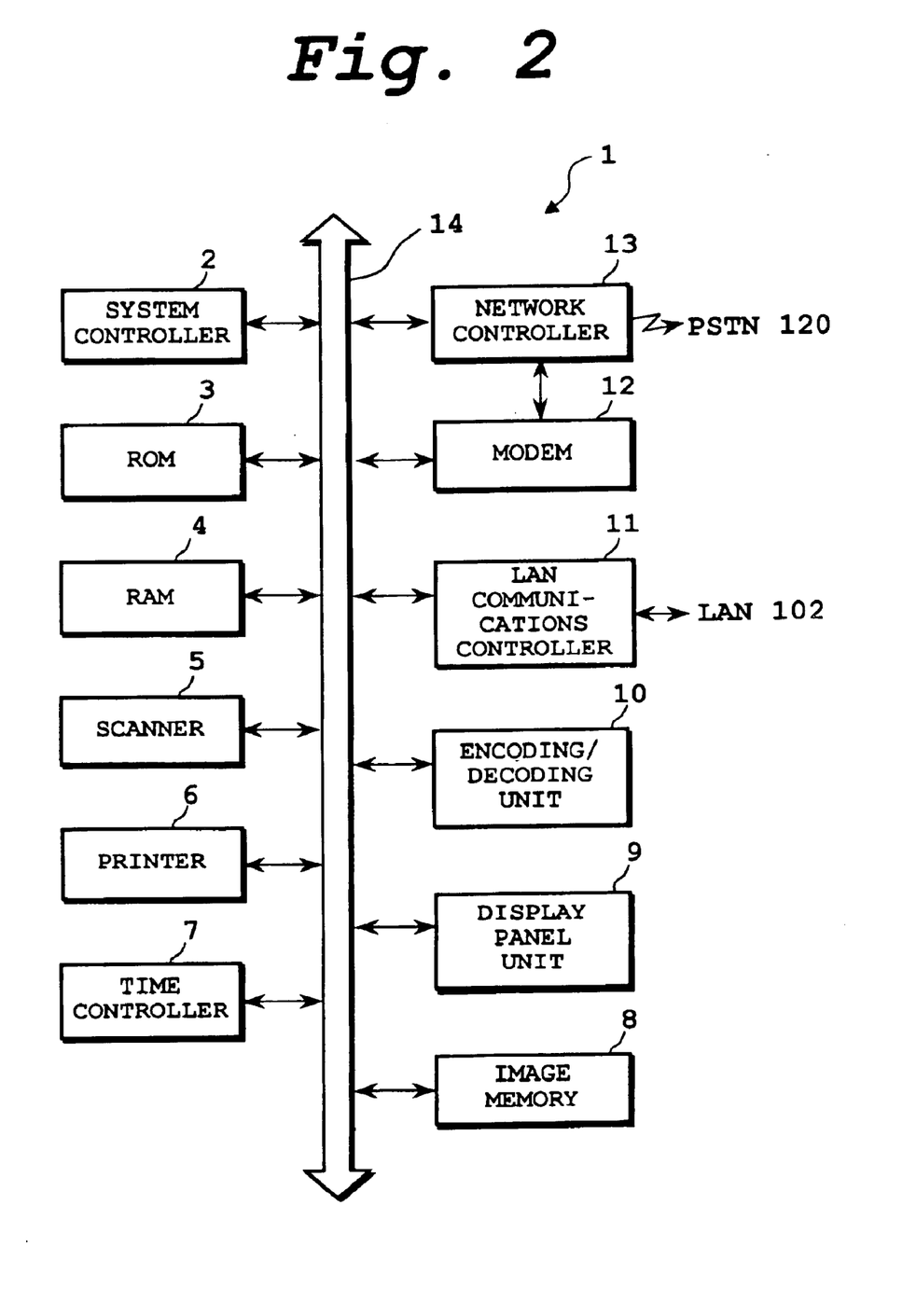
FIG. 2 is a block diagram of the network facsimile apparatus included in the electronic communications system of FIG. 1.

Next, an exemplary structure of the network facsimile apparatus 1 is explained with reference to FIG. 2. The network facsimile apparatus 1 includes a system controller 2, a ROM (read only memory) 3, a RAM (random access memory) 4, a scanner 5, a printer 6, a time controller 7, an image memory 8, a display panel unit 9, an encoding/decoding unit 10, a LAN (local area network) communications controller 11, a modem 12, a network controller 13, and an internal bus 14.

The system controller 2 controls the operations of the network facsimile apparatus 1 including facsimile data transmission controls for transmitting and receiving image information and arbitrary data files. The ROM 3 stores control (or application) programs to be performed by the system controller 2 and various kinds of data necessary for the execution of the control programs. The ROM 3 also stores various kinds of parameters and information specific to the network facsimile apparatus 1. The RAM 4 is supported by a backup battery circuit (not shown) so as to retain its contents in the event of a power failure, and includes a working memory area reserved for use of the system controller 2.

The scanner 5 reads an image of a document at a predetermined line resolution, i.e., 3.85 lines per mm, 7.7 line per mm, and 15.4 line per mm, and. The printer 6 produces an image output in accordance with the line resolution of the image information. The time controller 7 generates information of the present time, and sends a timeout signal to the system controller 2 in the event of a time out by counting down various time constants set by the system controller 2. The image memory 8 temporarily stores image information. The display panel unit 9 includes various kinds of operational keys (not shown) including a ten-key pad for entering destination facsimile numbers and the like, a start key for starting an operation such as a transmission of image information, and one-press-dialing keys each for entering an individual facsimile number or the like which is preset. The display panel unit 9 also includes various indicators (not shown) including a liquid crystal display, for example, for indicating various kinds of information including the operational statuses of the network facsimile apparatus 1 and various messages.

The encoding/decoding unit 10 compresses image information to be transmitted with a predetermined encoding method, and decompresses image information received, with a predetermined decoding method corresponding to the predetermined encoding method. The encoding/decoding methods used by the encoding/decoding unit 10 conform to the Group 3 facsimile communications procedure and may be an MH (modified huffman) method, an MR (modified READ (relative element address designate)) method, an MMR (modified modified READ (relative element address designate)) method, or the like.

The LAN communications controller 11 is connected to the LAN 102 in the domain 101, for example, and controls the TCP/IP protocols through the LAN 102 to allow the system controller 2 to transmit and receive E-mail using the respective protocols of SMTP, MIME, and POP in the LAN 102. The modem 12 is preferably a Group 3 facsimile modem that performs the functions of a modem for the Group 3 facsimile machine. The modem 12 includes a low-speed modem function, such as a V.21 modem, for transmitting and receiving communication protocols and a high-speed modem function, such as V.17, V.34, V.29, V.27ter modems, for mainly transmitting and receiving image information. The modem 12 modulates data to be transmitted to the PSTN 120 through the network controller 13 and demodulates a signal received from the PSTN 120 through the network controller 13. In addition, the modem 12 sends a DTMF (dial tone multi-frequency) signal which corresponds to the facsimile number entered. The network controller 13 is internally connected to the modem 12 and externally to the PSTN 120. The network controller 13 controls the connection of the network facsimile apparatus 1 to the PSTN 120. More specifically, the network controller 13 detects various events such as an inverse of the line polarity, establishment and release of the direct current line loop, a line disconnection, a dial tone, a busy (speech) tone, a calling signal, and so forth. Further, the network controller 13 generates and sends dialing pulses corresponding to the facsimile numbers entered in a form of dial pulse signals in accordance with a type of the dial line such as a 20 or 10 pps (pulse per second) dial line. The internal bus 14 is connected to all of the above-described units of the network facsimile apparatus 1 and allows communications between these units.

Figure 3:
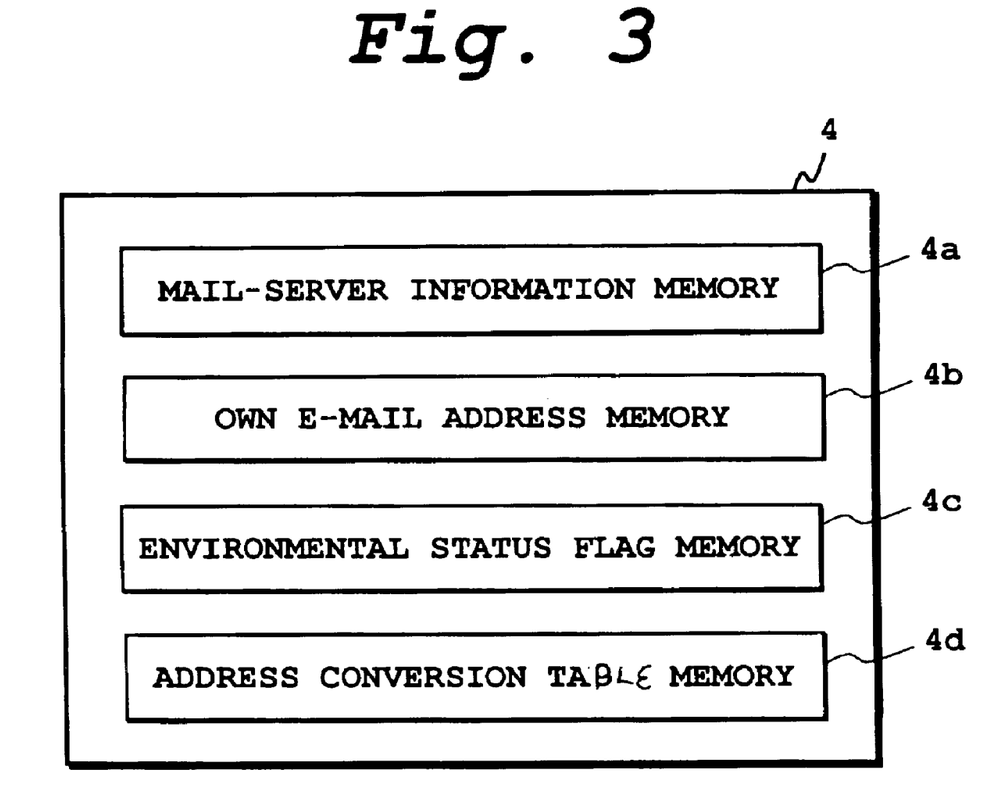
FIG. 3 is a block diagram of a plurality of memory blocks formed in a RAM (ransom access memory) of the network facsimile apparatus of FIG. 2.

In the thus-configured network facsimile apparatus 1, the RAM 4 includes a mail-server information memory 4a, an own E-mail address 4b, an E-mail condition status flag 4c, and an address conversion table 4d, as shown in FIG. 3. The mail-server information memory 4a stores various kinds of information, including a network address or the like, necessary for the network facsimile apparatus 1 to access the MS 104. The own E-mail address memory 4b stores the E-mail address, nf@abc.co.jp, assigned to the network facsimile apparatus 1. The E-mail condition status flag memory 4c stores an E-mail condition status flag Fm, explained later. The address conversion table memory 4d stores an address conversion table, explained later.

With the above-described configuration, the network facsimile apparatus 1 can perform a facsimile/E-mail transmission operation (explained later) using the E-mail functions of the LAN and Internet, as well as the ordinary facsimile operations. As described above, in the ordinary facsimile operations, the network facsimile apparatus 1 performs various operations from receiving image information sent via the PSTN 120 and recording it on a recording sheet with the printer 6 to reading an image with the scanner 5 and transmitting it to a designated destination facsimile machine via the PSTN 120, for example. On the other hand, the network facsimile apparatus 1 starts the facsimile/E-mail transmission operation at a receipt of a sub-address (identification information) contained in a sub-address signal SUB according to the recommendation T.30 of ITU-T (international telecommunication union-telecommunication) from other facsimile machines via the PSTN 120, and accordingly transmits the then received image information to a destination machine designated by the received sub-address via the LAN 102 and/or the Internet 130.

Figure 4:
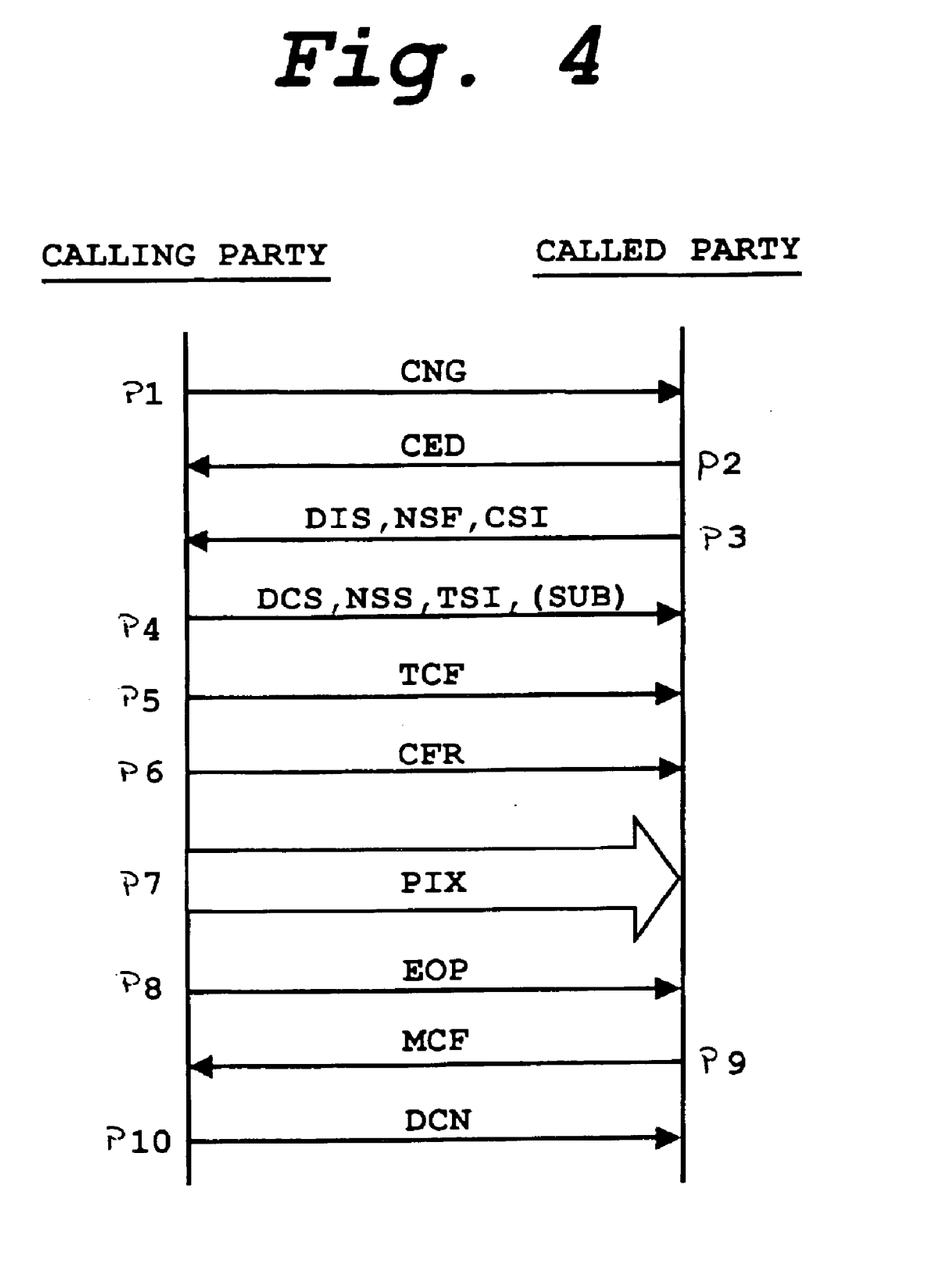
FIG. 4 is a diagram of an exemplary facsimile transmission sequence performed by the network facsimile apparatus of FIG. 2.

Referring to FIG. 4, an exemplary facsimile communications sequence with a transmission of the sub-address SUB is explained. In this facsimile communications sequence of FIG. 4, the FAX 121, for example, acts as a calling party and the network facsimile apparatus 1 acts as a called party.

In FIG. 4, before the sequence starts, the calling party FAX 121 establishes a line connection with the called party, the network facsimile apparatus 1, by sending a call to it. Upon this call establishment, in Phase P1, the FAX 121 sends a CNG (calling tone) signal to the network facsimile apparatus 1 in order to declare that the calling party FAX 121 is a facsimile machine. In Phase P2, the network facsimile apparatus 1 responses to the CNG signal by sending back a CED (called station identification) signal for declaring that the called network facsimile apparatus 1 is a facsimile machine and ready to receive signals. In Phase P3, the network facsimile apparatus 1 notifies the FAX 121 of its own communications capabilities by sending DIS (digital identification signal), NSF (non-standard facilities), and CSI (called station identification) signals.

Then, in Phase P4, the FAX 121 determines functions to be used for the transmission of the image information based on the NSF and DIS signals from the network facsimile apparatus 1, and informs the network facsimile apparatus 1 of the determined functions by sending DCS (digital command signal), NSS (non-standard facilities set-up), and TSI (transmitting subscriber identification) signals to the network facsimile apparatus 1. At this time, particularly when a sub-address has been designated before the call establishment is made, the FAX 121 also sends a SUB (sub-address) signal of which information field includes sub-address information specifying a destination machine. Then, in Phase P5, the FAX 121 sends a TCP (training check) signal to the network facsimile apparatus 1 in order to perform a modem training at a modem speed which is used for the transmission of the image information.

After a successful completion of the modem training, the network facsimile apparatus 1 returns a CFR (confirmation to receive) signal to the FAX 121, in Phase P6, and becomes ready to receive image information. Upon receiving the CFR from the network facsimile apparatus 1, the FAX 121 starts in Phase P7 to send a PIX (picture transmission) signal that includes image information to the network facsimile apparatus 1 at the modem speed which has been tested in the training operation. At this time, the FAX 121 can send binary data using BFT (binary file transfer) according to the extension function of the Group 3 facsimile, instead of sending the PIX signal. Then, after completing the PIX signal, the FAX 121 sends an EOP (end of procedure), in Phase P8, for indicating an end of the transmission procedure to the network facsimile apparatus 1.

The network facsimile apparatus 1 checks if the PIX signal received from the FAX 121 includes image information in an appropriate condition. If the network facsimile apparatus 1 determines that the PIX signal includes image information in an appropriate condition, the network facsimile apparatus 1 sends an MCF (message confirmation) back to the FAX 121, in Phase P9. Upon receiving the MCF signal, the FAX 121 sends in Phase P10 a DCN (disconnect) for commanding disconnection of the line to the network facsimile apparatus 1. Then, both calling party FAX 121 and the network facsimile apparatus 1 disconnect the line to end the communications session.

In this way, the network facsimile apparatus 1 can receive the facsimile image information with the designated sub-address information specifying the destination machine from the FAX 121 via the PSTN 120. The network facsimile apparatus 1 which receives image information with designated sub-address information can store such image information associated with the designated sub-address, instead of performing the recording operation which is normally performed. This makes a confidential communication possible in the communications system of FIG. 1 via the network facsimile apparatus 1. More specifically, if the network facsimile apparatus 1 stores image information with a designated sub-address specifying a destination machine, an operator can retrieve such image information by entering a specific ID (identification) number so predefined as to correspond to a specific sub-address and which is assigned to a specific user. After retrieving the image information, the operator can record it on a recording sheet with the printer 6, thereby obtaining a confidential communication.

Figure 5:
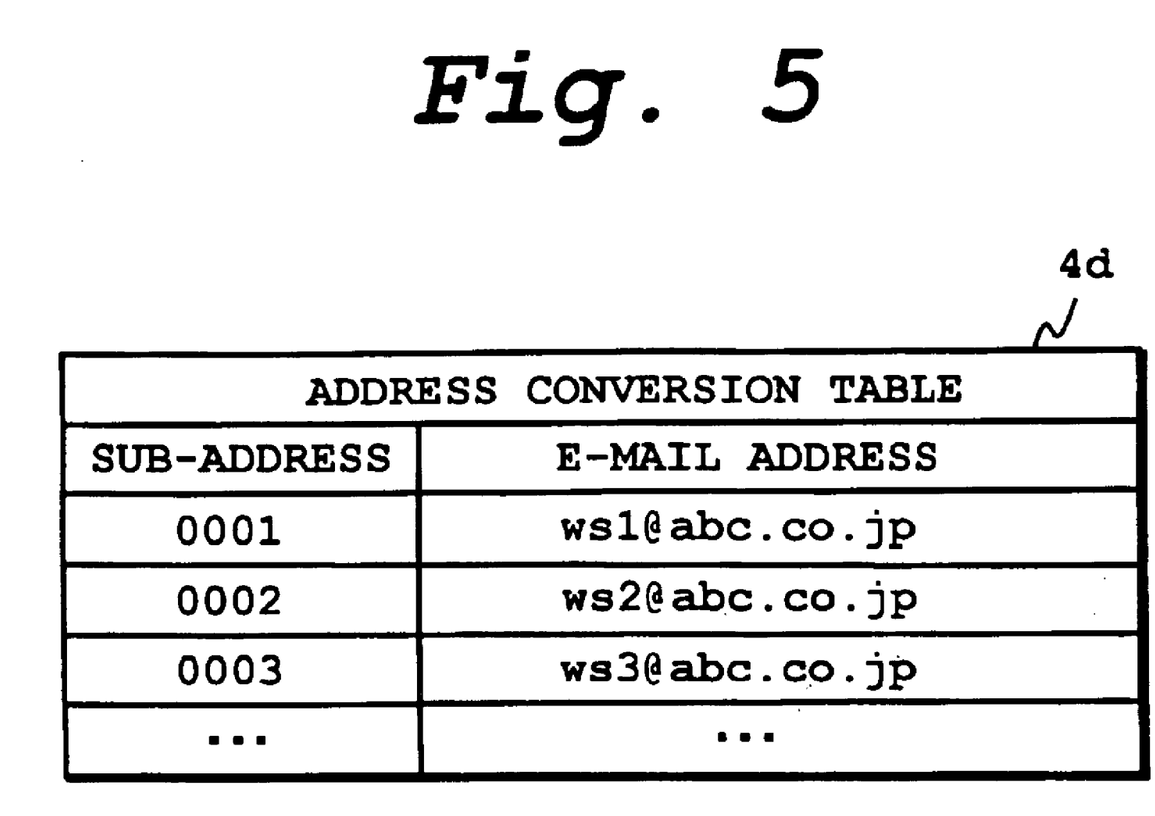
FIG. 5 is a diagram of an address conversion table formed in the RAM of the network facsimile apparatus of FIG. 2.

However, the network facsimile apparatus 1 uses the above-described sub-address to specify a destination workstation in the LAN, to which the received facsimile image information is to be transmitted. As described above, the network facsimile apparatus 1 is provided with the address conversion table 4d in the RAM 4. An example of the address conversion table 4d is shown in FIG. 5. In this address conversion table 4d, identification information contained in the sub-address signal SUB which is sent from the FAX 121, for example, to the network facsimile apparatus 1 is associated on a one-to-one basis with an E-mail address assigned to each workstation on the LAN. Therefore, upon receiving the sub-address during the facsimile receiving procedure, the network facsimile apparatus 1 handles it as the identification information and converts the received image information into an E-mail (i.e., a MIME formatted E-mail) to send it to an E-mail address corresponding to the received sub-address in accordance with the address conversion table 4d.

Thus, the network facsimile apparatus 1 can achieve the facsimile/E-mail transmission operation in which a facsimile image information file is transmitted from a calling facsimile machine (i.e., the FAX 121) to a specific destination workstation (i.e., the WS 103a) via the network facsimile apparatus 1. However, to make this operation successful, the network facsimile apparatus 1 needs to make sure that the LAN communications controller 11 properly operates and that the mail server information is properly stored in the mail-server information memory 4a so that the network facsimile apparatus 1 can properly perform the E-mail operation. In other words, if the network facsimile apparatus 1 receives a facsimile image communication accompanied with a sub-address when it is in the conditions in which the E-mail transmission cannot properly be performed, the calling party will successfully complete its transmission operation but the transmitted image information is held at the network facsimile apparatus 1 and not transmitted to the destination workstation.

Figure 6:
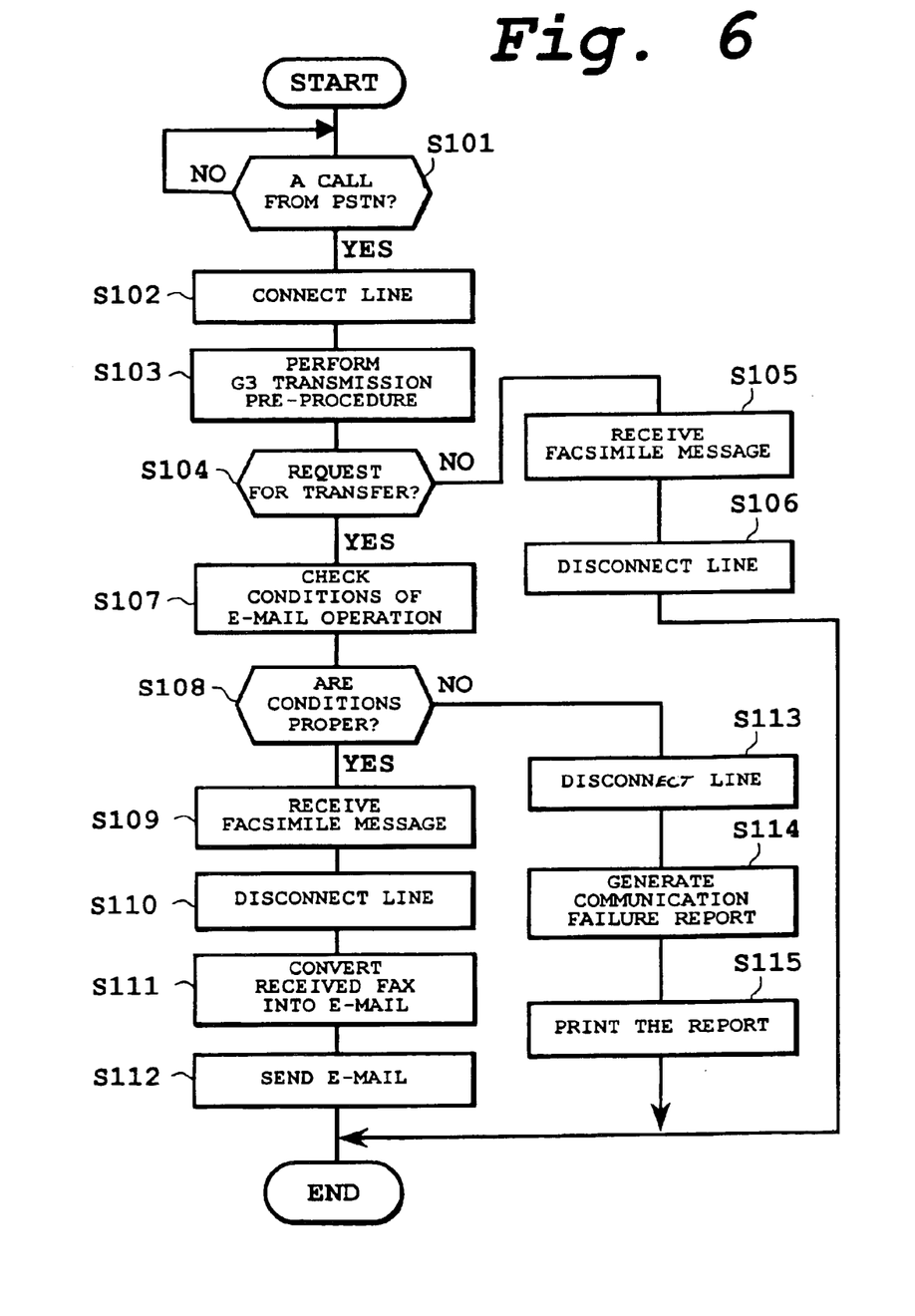
FIG. 6 is a flowchart explaining an exemplary procedure of a facsimile/E-mail operation performed by the network facsimile apparatus of FIG. 2.

Referring to FIG. 6, an exemplary facsimile receiving operation of the network facsimile apparatus 1 to avoid the above-described situation is explained below. In Step S101 of FIG. 6, the system controller 2 of the network facsimile apparatus 1 continuously watches for an arrival of a call sent from other facsimile machines via the PSTN 120 by monitoring the operations of the network controller 13 and comes out of Step S101 when finding a call (YES Step S101). Upon receiving a call, the system controller 2 proceeds to Step S102 and controls the network controller 13 to connect the line. In Step S103, the system controller 2 performs a predetermined Group-3 facsimile transmission pre-procedure according to the recommendations T.30. In Step S104, the system controller 2 checks if the network controller 13 receives address information in the sub-address signal SUB during the above-mentioned pre-procedure.

If the network controller 13 receives no address information and the check result of Step S104 is NO, the process goes to Step S105. In Step S105, the system controller 2 conducts the ordinary facsimile receiving operation and successively the recording operation. More specifically, the received facsimile message is decoded by the encoding/decoding unit 10, a bit-mapped image is formed in the image memory 8, and an output is produced on the printer 6. After a completion of these operations, in Step S106, the system controller 2 instructs the network controller 13 to disconnect the line. Then, the process ends.

If the network controller 13 receives address information and the check result of Step S104 is YES, the process goes to Step S107 in which the system controller 2 checks the conditions of the E-mail operation. In this operation, the system controller 2 checks if the mail-server information is properly stored in the mail-server information memory 4a and if the LAN communications controller 11 properly performs its communications functions. A loop-back test is preferably performed to check the LAN communications controller 11, in which an output signal from the LAN communications controller 11 to the LAN is monitored by the LAN communications controller 11 itself. In Step S108, the system controller determines if the conditions of the E-mail operation are proper according to the check result of Step S107.

If the conditions of the E-mail operation are proper and the determination result of Step S108 is YES, the system controller 2 conducts the facsimile receiving operation in Step S109. In the facsimile receiving operation, the received facsimile message is decoded by the encoding/decoding unit 10 and a bit-mapped image is formed in the image memory B. After a completion of these operations, the system controller 2 instructs in Step S110 the network controller 13 to disconnect the line. Then, the system controller 2 converts the received facsimile message into data of E-mail (i.e., the MIME or DCX formatted E-mail) in Step S111. After that, in Step S112, the system controller 2 sends the E-mail to a destination workstation having an E-mail address converted with the address conversion table 4a using the address information of the sub-address signal SUB obtained in Step S103. The process then ends.

If the conditions of the E-mail operation are improper and the determination result of Step S108 is NO, the process proceeds to Step S113 in which the system controller 2 conducts no facsimile receiving operation but instructs the network controller 13 to disconnect the line. Thereby, the calling party FAX 121 can recognize the failure caused on the transmission. On the other hand, in this way, the network facsimile apparatus 1 can avoid the operation for receiving a needless facsimile message which cannot be sent to the destination workstation since the conditions of the E-mail operation are improper.

After the disconnection of the line, the system controller 2 conducts in Step S114 a generation of a communication failure report relating to the failed communication, using the image memory 8. Then, in Step S115, the system controller 2 instructs the printer 6 to produce the communication failure report on a recording sheet. The process then ends.

Figure 7:
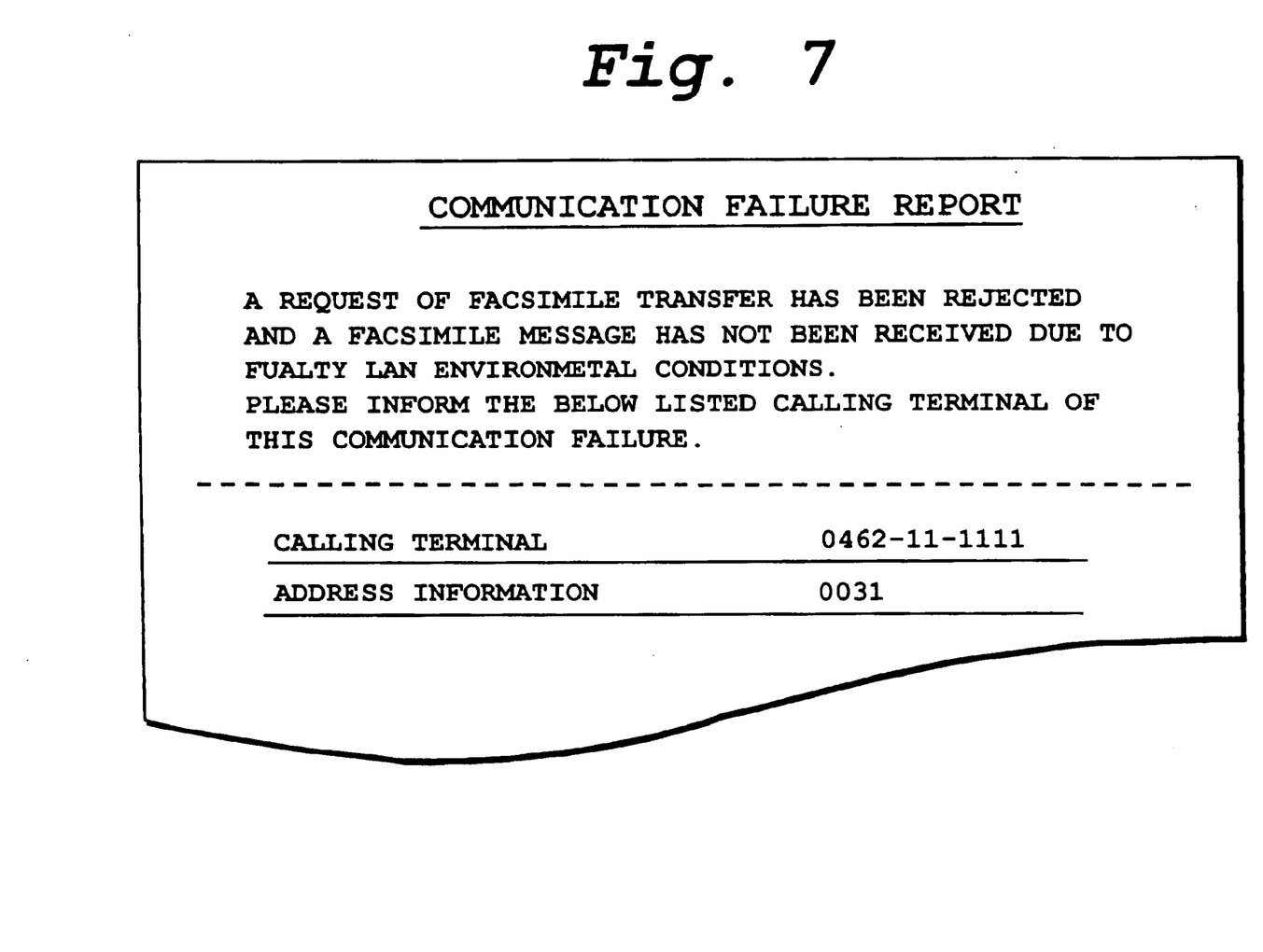
FIG. 7 is an illustration for explaining an exemplary communication failure report generated on the network facsimile apparatus of FIG. 2.

FIG. 7 shows an example of the communication failure report produced in Step S114. This exemplary communication failure report describes that the request for the facsimile/E-mail operation has been refused because the conditions of the E-mail operation are improper and also describes that the operator is requested to inform the calling party that the facsimile message has not been received. The communication failure report of FIG. 7 also records the facsimile number of the calling party, 0462-11-1111, and the address information contained in the sub-address signal SUB, 0031.

With this communication failure report, the operator of the network facsimile apparatus 1 can recognize that the conditions of the E-mail operation are improper on the network facsimile apparatus 1 and can therefore take a necessary action for correcting the fault. Further, with this communication failure report, the operator can inform, after completing the correction of the fault, the calling party to request a re-sending of the facsimile message using the facsimile number of the calling party, 0462-11-1111, and the address information contained in the sub-address signal SUB, 0031.

In addition, during the check of the conditions of the E-mail operation performed in Step S107 of FIG. 6, the system controller 2 may refer to and use the value of the E-mail condition status flag Fm stored in the E-mail condition status flag memory 4c in a manner described below.

Figure 8:
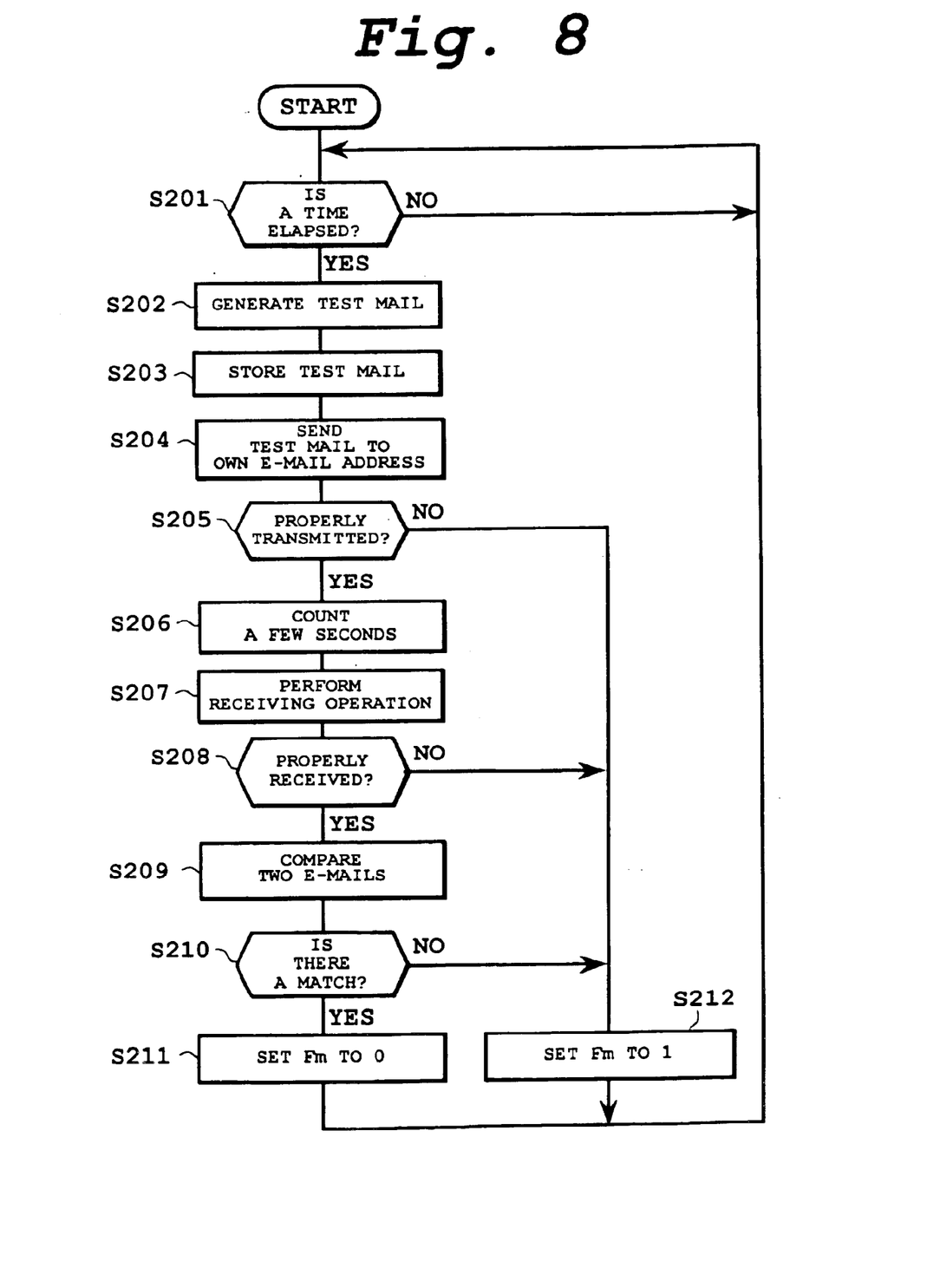
FIG. 8 is a flowchart explaining an exemplary procedure of a test mail operation performed by the network facsimile apparatus of FIG. 2.

Referring to FIG. 8, an exemplary test-mail operation of the network facsimile apparatus 1 is explained. This test-mail operation is to refer to and use the value of the E-mail condition status flag Fm stored in the E-mail condition status flag memory 4c during the check of the conditions of the E-mail operation performed in Step S107 of FIG. 6. In Step S201 of FIG. 8, the system controller 2 continuously checks if a predetermined time period (i.e., a 20-minute time period) has elapsed using the time controller 7. The process proceeds to Step S202 when the predetermined time period has elapsed and the check result of Step S201 is YES. In Step S202, the system controller 2 conducts a generation of a test mail. The test mail may be a simple one, describing only the date on which the test mail is generated, for example. In Step S203, the generated test mail is stored in the RAM 4 as an original to be evaluated in a process explained later.

In Step S204, the system controller 2 conducts the transmission of the test mail to the network facsimile apparatus 1 itself using the own E-mail address stored in the own E-mail address memory 4b. In this case, the test mail transmitted in Step S204 will reach in a few seconds a mailbox preserved for the network facsimile apparatus 1 in the MS 104 if the conditions of the E-mail operation are proper. That is, the test mail will successfully be achieved if the test mail is successfully transmitted from the network facsimile apparatus 1 to the MS 104 through the SMTP procedure and if the transmitted test mail is successfully delivered from the MS 104 to the designated E-mail address.

Therefore, in Step S205, the system controller 2 checks if the test mail has been properly transmitted. If the test mail has not been transmitted properly and the check result of Step S205 is NO, the process proceeds to Step S212 in which the system controller 2 sets the condition status flag Fm stored in the condition status flag memory 4c to 1. Then, the process returns to Step S201 in order to repeat the above-described processes. If the test mail has been transmitted properly and the check result of Step S205 is YES, the process proceeds to Step S206. In Step S206, the system controller 2 counts a predetermined time period (i.e., a few seconds) in order to wait until the test mail is stored in the mail box preserved for the network facsimile apparatus 1 in the MS 104. After that, in Step S207, the system controller 2 conducts a E-mail receiving operation, using the POP protocol, for accessing the MS 104 and receiving the test mail stored in the mail box preserved for the network facsimile apparatus 1.

Then, in Step S208, the system controller 2 checks if the E-mail receiving operation in Step S207 is properly performed. If the E-mail receiving operation in Step S207 is not properly performed and the check result of Step S208 is NO, the process proceeds to Step S212 in which the system controller 2 sets the condition status flag Fm stored in the condition status flag memory 4c to 1. After that, the process returns to Step S201 in order to repeat the above-described processes.

If the E-mail receiving operation in Step S207 is properly performed and the check result of Step S208 is YES, the process proceeds to Step S209 and the system controller 2 compares the received mail with the original test mail stored in the RAM 4. Then, in Step S210, the system controller 2 checks if the contents of the received mail matches the contents of the original test mail. If the contents of the received mail does not match the contents of the original test mail and the check result of Step S210 is NO, the process proceeds to Step S212 in which the system controller 2 sets the condition status flag Fm stored in the condition status flag memory 4c to 1. After that, the process returns to Step S201 in order to repeat the above-described processes. If the contents of the received mail matches the contents of the original test mail and the check result of Step S210 is YES, the process proceeds to Step S211 in which the system controller 2 sets the condition status flag Fm stored in the condition status flag memory 4c to 0. After that, the process returns to Step S201 in order to repeat the above-described processes.

In this way, the value of the condition status flag Fm is set. The thus-set condition status flag Fm is referred to during the check of the conditions of the E-mail operation performed in Step S107 of FIG. 6. That is, when the value of the condition status flag Fm is 1, the system controller 2 determines in Step S108 of FIG. 6 that the conditions of the E-mail operation are improper. Therefore, the determination result of Step S108 is made NO. This can make sure that an occurrence of an event that the network facsimile apparatus 1 cannot transfer a received facsimile message to a destination workstation is avoided, not only in the case that the conditions of the E-mail operation are improper in the network facsimile apparatus 1 itself but also in the case that the conditions of the E-mail operation in the LAN environment are improper.

The embodiment of the present application may be conveniently implemented using a conventional general purpose digital computer programmed according to the teachings of the present specification, as will be apparent to those skilled in the art. Appropriate software coding can readily be prepared based on the teachings of the present disclosure, as will be apparent to those skilled in the art. The present application may also be implemented by the preparation of application specific integrated circuits or by interconnecting an appropriate network of conventional component circuits, as will be readily apparent to those skilled in the art.

Numerous additional modifications and variations of the present application are possible in light of the above teachings. It is therefore to be understood that within the scope of the appended claims, the present application may be practiced otherwise than as specifically described herein.

I claim:

1. A data terminal which is coupled to a local area network and a public switched telephone network, comprising:

a first communications device that transmits and receives communications data through said local area network;

a second communications device that transmits and receives communications information through said public switched telephone network; and a controller that instructs said first communications device to perform a first data transfer operation for transferring communications data to a destination data terminal connected to said local area network when said second communications device receives destination identification information identifying said destination data terminal during a time when said second communications device performs a receiving operation for receiving said communications information from a communications machine connected to said public switched telephone network, wherein said controller determines whether conditions of said local area network are proper for said first data transfer operation to be performed by said first communications device and instructs said second communications device to terminate said receiving operation when said controller determines that said conditions of said local area network are not proper for said first data transfer operation.

2. The data terminal as defined in claim 1, wherein said controller generates a communications failure report upon conducting a termination of said receiving operation performed by said second communications device.

3. The data terminal as defined in claim 1, wherein said controller generates a test message, instructs said first communications device to periodically perform a second data transfer operation for transmitting said test message to an address of said data terminal such that said first communications device receives said test message returning via said local area network, detects an event in which said first communications device improperly receives said test message, and determines that said conditions of communications operations are improper when said event is detected.

4. The data terminal as defined in claim 1, wherein said communications data is E-mail.

5. The data terminal as defined in claim 1, wherein said communications information is facsimile image information.

6. The data terminal as defined in claim 1, wherein said destination identification information is a sub-address.

7. A data terminal which is coupled to a local area network and a public switched telephone network, comprising:

first communications means for transmitting and receiving communications data through said local area network;

second communications means for transmitting and receiving communications information through said public switched telephone network; and controlling means for instructing said first communications means to perform a first data transfer operation for transferring communications data to a destination data terminal connected to said local area network when said second communications means receives destination identification information identifying said destination data terminal during a time when said second communications means performs a receiving operation for receiving said communications information from a communications machine connected to said public switched telephone network, wherein said controlling means determines whether conditions of said local area network are proper for said first data transfer operation performed by said first communications means and instructs said second communications means to terminate said receiving operation when said controlling means determines that said conditions of said local area network are not proper for said first data transfer operation.

8. The data terminal as defined in claim 7, wherein said controlling means generates a communications failure report upon conducting a termination of said receiving operation performed by said second communications means.

9. The data terminal as defined in claim 7, wherein said controlling means generates a test message, instructs said first communications means to periodically perform a second data transfer operation for transmitting said test message to an address of said data terminal such that said first communications means receives said test message returning via said local area network, detects an event in which said first communications means improperly receives said test message, and determines that said conditions of communications operations are improper when said event is detected.

10. The data terminal as defined in claim 7, wherein said communications data is E-mail.

11. The data terminal as defined in claim 7, wherein said communications information is facsimile image information.

12. The data terminal as defined in claim 7, wherein said destination identification information is a sub-address.

13. A method of communications for a data terminal which is coupled to a local area network and a public switched telephone network, comprising the steps of:

performing a receiving operation for receiving communications information from a communications machine connected to said public switched telephone network;

receiving destination identification information identifying a destination data terminal during said step for performing said receiving operation;

executing a first data transfer operation for transferring communications data to a destination data terminal connected to said local area network;

determining whether conditions of said local area network are proper for said first data transfer operation; and terminating said receiving operation when said determining step determines that said conditions of said local area network are not proper for said first data transfer operation.

14. The method as defined in claim 13, further comprising a step of generating a communications failure report upon an event that said receiving operation is terminated by said terminating step.

15. The method as defined in claim 13, further comprising steps of:

generating a test message;

periodically performing a second data transfer operation for transmitting said test message to an own address of said data terminal such that said data terminal receives said test message returning via said local area network;

detecting an event in which said data terminal improperly receives said test message; and determining that said conditions of communications operations are improper when said event is detected.

16. The method as defined in claim 13, wherein said communications data is E-mail.

17. The method as defined in claim 13, wherein said communications information is facsimile image information.

18. The method as defined in claim 13, wherein said destination identification information is a sub-address.

\* \* \* \* \*